United States Patent
Pusukuri et al.

(10) Patent No.: US 9,823,871 B2
(45) Date of Patent: Nov. 21, 2017

(54) PERFORMANCE OF COPROCESSOR ASSISTED MEMSET() THROUGH HETEROGENEOUS COMPUTING

(71) Applicant: Oracle International Corporation, Redwood Shores, CA (US)

(72) Inventors: Kishore Pusukuri, Santa Clara, CA (US); Robert D. Gardner, Fort Collins, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/879,970

(22) Filed: Oct. 9, 2015

(65) Prior Publication Data

US 2017/0102892 A1   Apr. 13, 2017

(51) Int. Cl.
*G06F 3/06* (2006.01)

(52) U.S. Cl.
CPC .......... *G06F 3/0631* (2013.01); *G06F 3/0604* (2013.01); *G06F 3/0673* (2013.01)

(58) Field of Classification Search
CPC ..... G06F 3/0604; G06F 3/0631; G06F 3/0673

USPC ................. 711/147, 150, 168, 169
See application file for complete search history.

(56) References Cited

U.S. PATENT DOCUMENTS

2009/0089515 A1* 4/2009 Michalak ............ G06F 13/1668
  711/154
2012/0216002 A1* 8/2012 Moyer ................ G06F 12/1416
  711/163

* cited by examiner

*Primary Examiner* — Jasmine Song
(74) *Attorney, Agent, or Firm* — Hickman Palermo Becker Bingham LLP (57) ABSTRACT

Techniques herein perform coprocessor assisted memory filling in a pipeline. A computer receives a request to fill multiple ranges of memory addresses with a value. The computer selects a first subset of the multiple ranges and distributes the first subset of ranges to multiple coprocessors. The coprocessors begin to fill the memory locations of the first subset of ranges with the value. At the same time as the coprocessors fill the first subset of ranges, the computer selects a second subset of the multiple ranges of memory addresses. Also while the coprocessors are still filling the first subset of ranges, the computer distributes the second subset of ranges to the coprocessors This overlapping activity achieves a processing pipeline that can be extended for any amount of additional subsets of memory ranges.

21 Claims, 6 Drawing Sheets

PERFORMANCE OF COPROCESSOR ASSISTED MEMSET() THROUGH HETEROGENEOUS COMPUTING

FIELD OF THE DISCLOSURE

This disclosure relates to filling memory ranges with a value. Techniques of distributing the memory ranges to coprocessors that perform the filling are presented.

BACKGROUND

A common activity in general purpose computing is the filling of all memory locations within a given memory region with a given constant value. For example, memset is a standard subroutine to perform such filling. Decompressing a run-length encoding is an example that may use memset to fill an arbitrary region of memory with an arbitrary repeating value.

A newly allocated memory region may typically be initially cleared by filling all of its memory locations with zero, as specified by standard memory allocation subroutines such as calloc. For example, when only one execution thread is utilized, up to 90% of the time needed to allocate a virtual memory page may be spent zero filling the allocation. Page clearing is important because a newly allocated physical page of memory may contain meaningless garbage values, either from a prior use or as an electrical accident from when a computer was powered on.

An object oriented language may implicitly fill memory with a constant for a newly constructed object. For example depending on the element type of a Java array, the array may be initially filled with zero, null, or false. As such, memory filling may be an important activity at all levels of processing abstraction, from memory pages allocated by an operating system, to buffers allocated by a standard subroutine, to objects constructed by a high level language.

A performance problem at all of these levels is that memory filling is typically performed by a single execution thread, thereby limiting the throughput of the filling to less than the processing throughput of the host computer. As such, memory filling typically underutilizes the host computer, which can cause some available hardware to idle.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
 2.0 Computer Overview
 2.1 Hardware Architecture
 2.2 Memory Architecture
 2.3 Software Architecture
 3.0 Example Filling Process
 3.1 Preparation
 3.2 Pipelining
 4.0 Decomposing an Address Range into Subranges
 5.0 Virtual Memory
 5.1 Calloc
 5.2 Fragmentation
 5.3 Large Virtual Pages
 5.4 Bin Packing
 5.5 Fill Command
 5.6 Command Queue
 6.0 Heterogeneous Horizontal Scaling
 6.1 Heterogeneous Load Balancing
 7.0 Hardware Overview 1.0 General Overview Computerized techniques are provided for accelerating co-processor assisted memory filling through heterogeneous computing. In an embodiment, a computer receives a request to fill multiple ranges of memory addresses with a value. The computer selects a first subset of the multiple ranges and distributes the first subset of ranges to multiple coprocessors.

The coprocessors begin to fill the memory locations of the first subset of ranges with the value. At the same time as the coprocessors fill the first subset of ranges, the computer selects a second subset of the multiple ranges of memory addresses. Also while the coprocessors are still filling the first subset of ranges, the computer distributes the second subset of ranges to the coprocessors This overlapping activity achieves a processing pipeline that can be extended for any amount of additional subsets of memory ranges.

In an embodiment, each coprocessor maintains a queue of fill commands to buffer a backlog. In another embodiment, the computer operates a central processing unit (CPU) as if it were an additional coprocessor, thereby increasing horizontal scaling and achieving memory filling by heterogeneous computing.

2.0 Computer Overview

Figure 1:
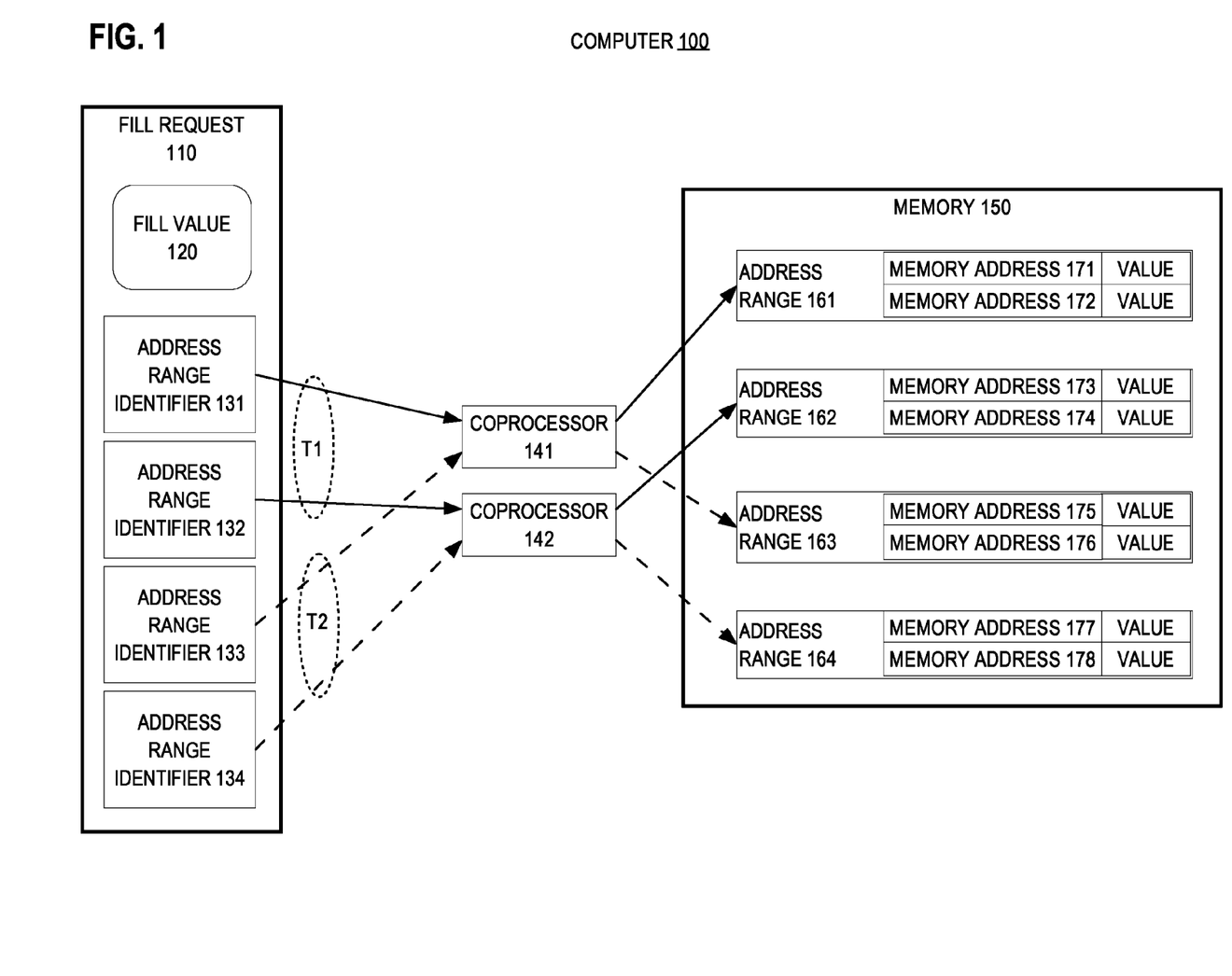
FIG. 1 is a block diagram that depicts an example computer that fills memory, in an embodiment.

FIG. 1 is a block diagram that depicts an example computer 100, in an embodiment. Computer 100 improves performance of coprocessor assisted memory filling by decomposing a fill request into phases to achieve pipelining.

2.1 Hardware Architecture

Computer 100 includes at least one fill request 110, at least one memory 150, and at least coprocessors 141-142. Coprocessors 141-142 may both occupy the same integrated circuit chip. That chip may be a system on a chip (SoC) that includes a central processing unit (CPU) and perhaps memory 150.

Coprocessors 141-142 may have various architectures. For example, a coprocessor may be an application specific integrated circuit (ASIC) that is dedicated to memory manipulation, such as filling, block transfers (blitting), and direct memory access (DMA). A coprocessor may be a graphics coprocessor. A coprocessor may be a general purpose instruction processor, perhaps with a memory cache, multiple execution cores, and superscalar multithreading.

Memory 150 may be any combination of volatile and non-volatile random access memory (RAM) modules. Memory 150 may typically be a main memory. Memory 150 comprises a contiguous range of addressable storage locations, which may be physically divided across multiple memory modules and may be logically divided into physical memory pages. Memory 150 may be operated as a virtual memory by a memory management unit that performs address translation.

2.2 Memory Architecture

In operation, computer 100 receives fill request 110 that includes address range identifiers 131-134 and fill value 120. Fill value 120 may be any discrete value capable of storage in an addressable memory location. Per implementation, fill value 120 may be a byte value or a machine-word value, perhaps depending on whether memory 150 is byte-addressable or word-addressable. Zero is a common value, because memory allocations typically need zeroing before use. For example, 90% of memory page initialization time may be spent on zeroing.

Each of address range identifiers 131-134 specifies a respective portion, or set of addresses, of memory 150. Identified address ranges may have different sizes within the same fill request. Although the addresses within each identified address range are contiguous, multiple identified ranges need not be contiguous with each other.

In an embodiment, the identified address ranges of fill request 110 may be physical address ranges, with each physical range translated from a subrange of a monolithic virtual address range. For example, a virtual memory page may have a continuous address range of multiple gigabytes, whereas a physical memory page may have only a few kilobytes.

As such, a virtual memory page may correspond to hundreds of physical memory pages. However, physical memory is prone to fragmentation. Often only some of the corresponding hundreds of physical pages may be contiguous within memory 150. For example, the corresponding physical pages may occur as multiple regions, with each region having contiguous physical pages that are a portion of the corresponding hundreds of physical pages. Each of those corresponding regions may be identified by an address range identifier, such as identifiers 131-134.

2.3 Software Architecture

Computer 100 may delegate the filling of any identified address range with fill value 120 to any of coprocessors 141-142. Before coprocessors 141-142 can begin filling memory locations with fill value 120, computer 100 first prepares. This preparation entails assigning address range identifiers to coprocessors 141-142. When assigning an address range, computer 100 may attempt load balancing of coprocessors 141-142 by considering the size of an identified address range and the demand backlog of a coprocessor.

Preparation by computer 100 for memory filling by coprocessors 141-142 also entails configuring them by communicating an address range identifier to each coprocessor. Communication between a CPU of computer 100 and a coprocessor may entail inter-chip communication.

Selecting address ranges and communicating them to coprocessors 141-142 may incur significant latency, as compared to the time that a coprocessor takes to fill a memory range. This preparation before coprocessing may impact throughput by causing a coprocessor to idle.

2.3.1 Pipelining

Computer 100 increases throughput with pipelining by decomposing fill request 110 into sub-requests whose executions are interleaved according to the two phases of preparation and coprocessing. Computer 100 may decompose fill request 110 into sub-requests according to count of address range identifiers or sum of address range sizes.

For example, computer 100 may decompose fill request 110 into sub-requests of ten range identifiers each. Computer 100 may decompose fill request 110 into sub-requests of ten megabytes each.

Alternatively, computer 100 may decompose fill request 110 into a fixed count of sub-requests. In this example, computer 100 splits every fill request 110 in half, with each sub-request having half of the address range identifiers.

In this example, splitting fill request 110 results in a sub-request for address range identifiers 131-132 and another sub-request for address range identifiers 133-134. The executions of these two sub-requests are partially overlapped to achieve pipelining.

At time T1, computer 100 prepares the first sub-request, including communicating with coprocessors 141-142, shown as solid arrows pointing at the coprocessors. At time T2, computer 100 prepares the second sub-request, including communicating with coprocessors 141-142, shown as dashed arrows pointing at the coprocessors.

Pipelining is achieved at time T2 because that is also when coprocessors 141-142 fulfill the first sub-request by actually filling address ranges 161-162 with fill value 120, shown as solid arrows pointing at those address ranges. Later, the coprocessors will also fulfill the second sub-request by actually filling address ranges 163-164, shown as dashed arrows pointing at those address ranges.

3.0 Example Filling Process

Figure 2:
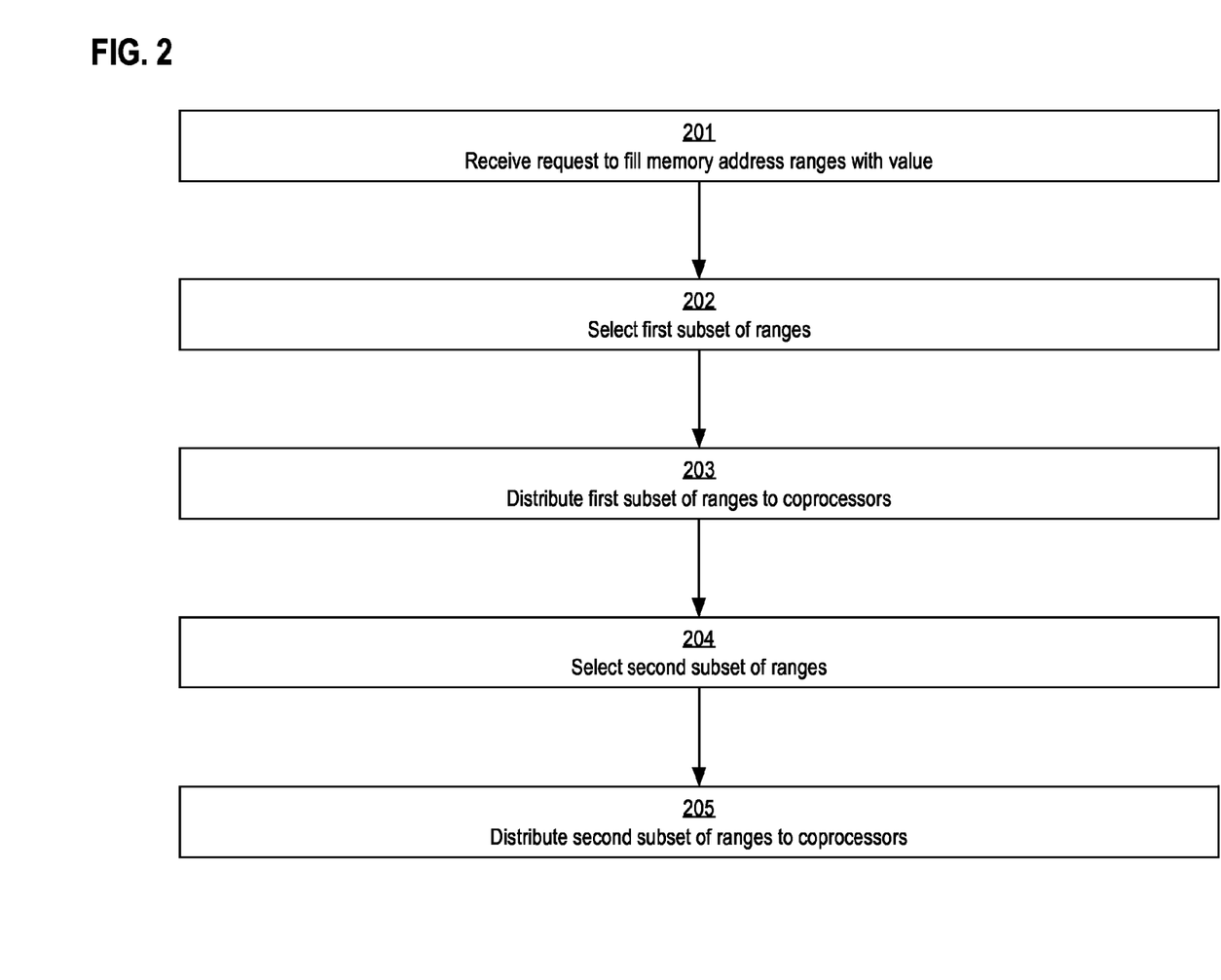
FIG. 2 is a flow diagram that depicts an example memory filling process, in an embodiment.

FIG. 2 is a flow diagram that depicts an example filling process, in an embodiment. The filling process is described in the context of FIG. 1.

3.1 Preparation

Some preparatory steps occur before coprocessing starts. A request, to fill memory address ranges with a value, is received in step 201. For example, computer 100 receives fill request 110. Fill request 110 may be a request to clear by zeroing the contents of scattered physical pages that support a monolithic virtual memory page or other memory allocation. Alternatively, a direct invocation of a memset or bzero subroutine by a user application may include generating fill request 110.

Some of the address ranges identified within the fill request are selected as a first subset of ranges in step 202. To reduce coprocessor idling, the first subset of address ranges does not have all of the ranges identified in fill request 110. For example after splitting fill request 110 in half, computer 100 selects address range identifiers 131-132 as the first subset at time T1.

The first subset of address ranges is distributed to coprocessors in step 203. For example, computer 100 transfers address range identifier 131 to coprocessor 141 and address range identifier 132 to coprocessor 142, also at time T1.

3.2 Pipelining

After step 203, a processing pipeline may begin to operate. For example, two activities occur simultaneously during step 204 at time T2. While the coprocessors begin actually filling memory, a second subset of address ranges is selected. For example, computer 100 selects address range identifiers 133-134 as a second subset.

Pipelining continues during step 205. While the coprocessors continue filling memory, computer 100 transfers address range identifier 133 to coprocessor 141 and address range identifier 134 to coprocessor 142, also at time T2.

For simplicity of demonstration, FIGS. 1-2 show the address range identifiers of fill request 110 as divided into only two subsets to be processed at different pipeline phases T1 and T2. Other examples may involve hundreds of address range identifiers within a single fill request. The more address ranges are involved, the more pipeline phases may be used. For example, computer 100 may need 50 pipeline phases to process one fill request having 100 address range identifiers.

Computer 100 may achieve further pipelining that extends beyond a single fill request. For example, computer 100 may perform any of steps 201-205 for one fill request while coprocessors 141-142 simultaneously fill memory for another fill request.

4.0 Decomposing an Address Range into Subranges

Figure 3:
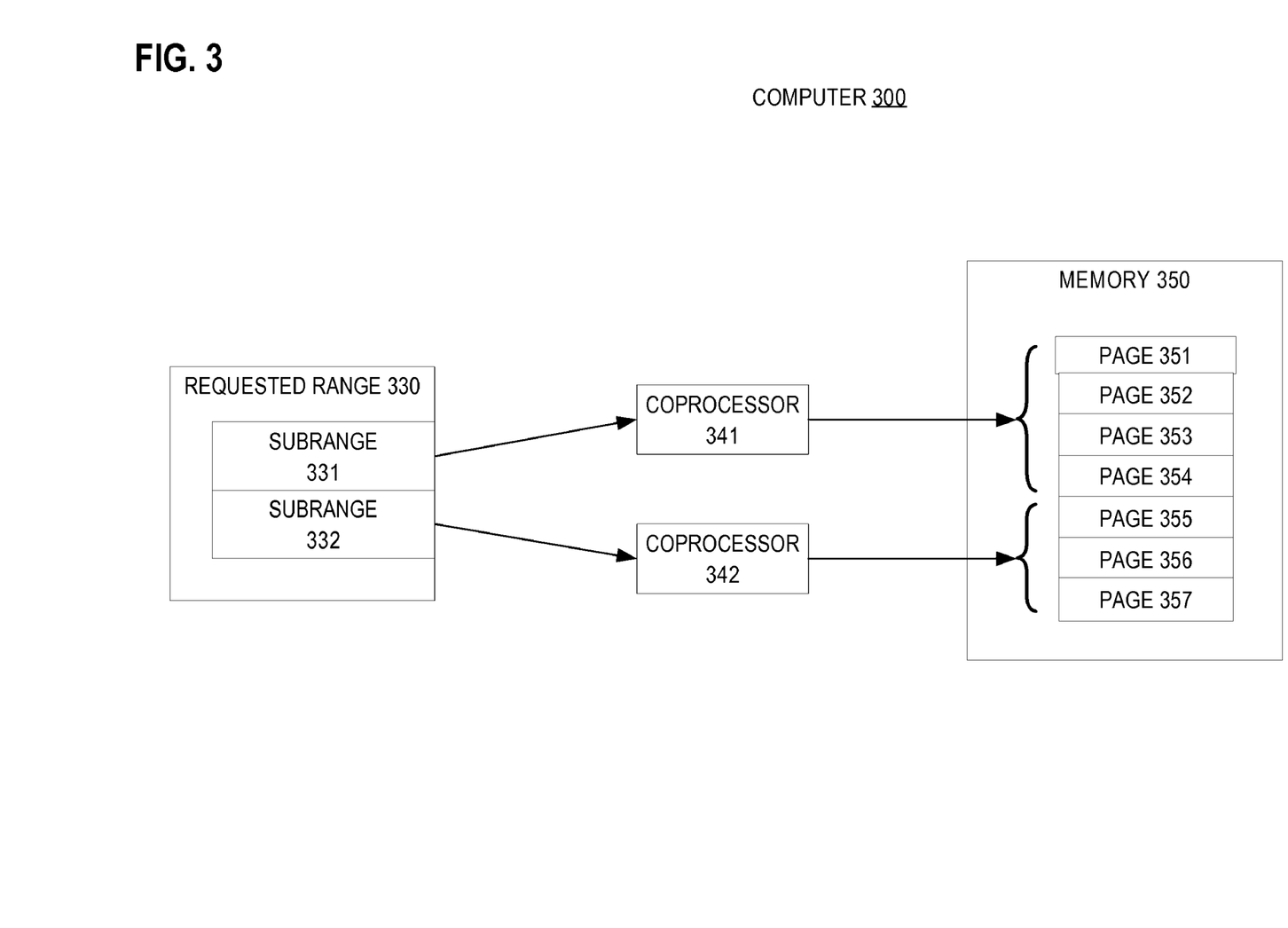
FIG. 3 is a block diagram that depicts an example computer that fills memory, in an embodiment.

FIG. 3 is a block diagram that depicts an example computer 300, in an embodiment. Computer 300 balances the workload amongst coprocessors by splitting a large address range to be filled into several smaller address subranges.

Computer 300 may be an implementation of computer 100. Computer 300 includes coprocessors 341-342, memory 350, and requested range 330. Requested range 330 may be one of many address ranges that are identified in a single fill request.

In this example, requested range 330 is very large and covers many memory addresses. Requested range 330 could be delegated to a single coprocessor. However, because requested range 330 is so large, computer 100 uses horizontal scaling to accelerate memory filling by giving a portion of requested range 330 to each of coprocessors 341-342.

For example, computer 100 splits requested range 330 into subranges 331-332. Computer 100 then transfers an identifier of subrange 331 to coprocessor 341 and an identifier of subrange 332 to coprocessor 342.

The operating system of computer 300 may logically operate memory 350 as a set of memory pages that include pages 351-357. When coprocessor 341 processes subrange 331, coprocessor 341 may fill memory pages 351-354 with a value. At the same time, coprocessor 342 may fill memory pages 355-357 with the same value.

5.0 Virtual Memory

Figure 4:
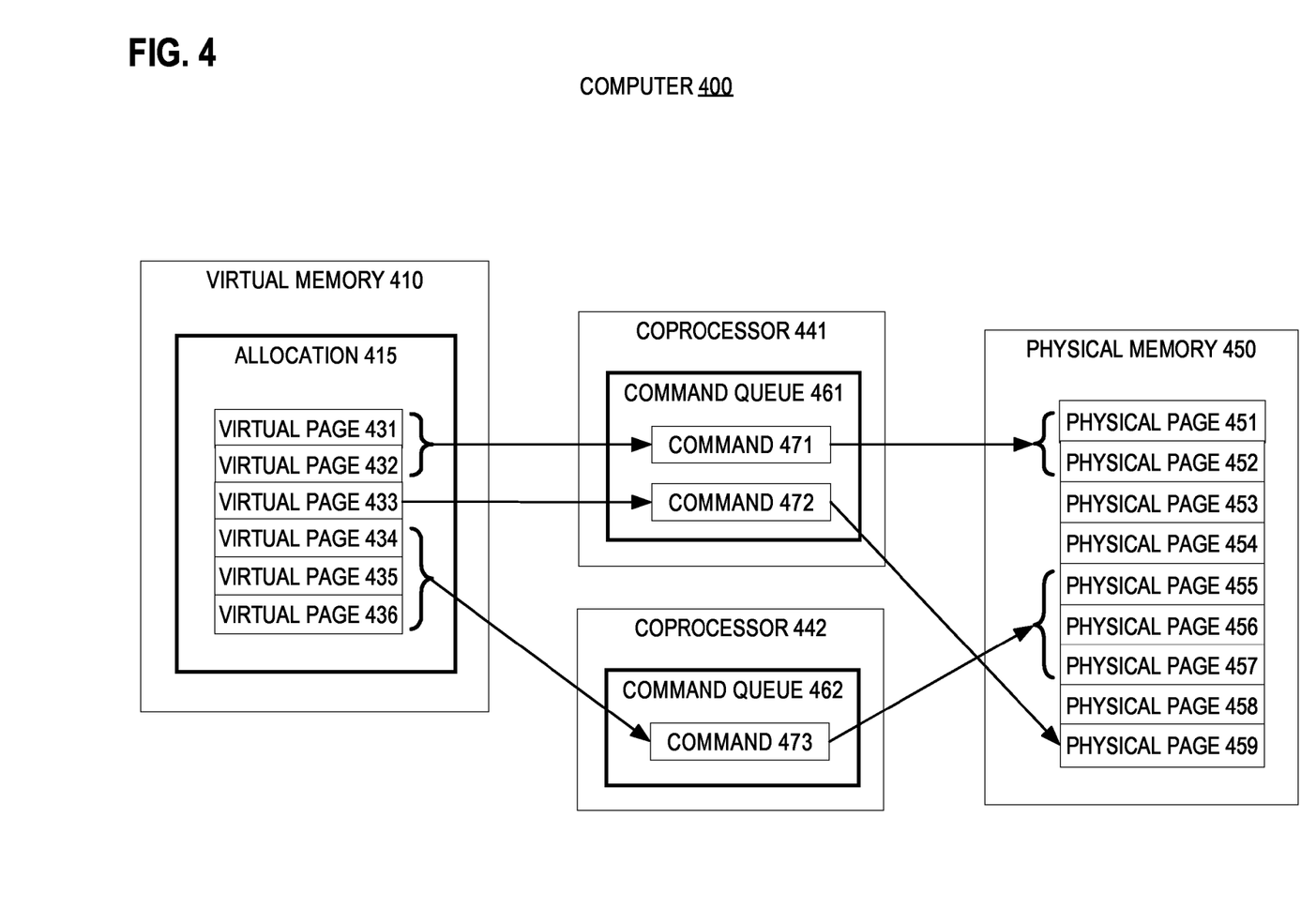
FIG. 4 is a block diagram that depicts an example computer that fills memory, in an embodiment.

FIG. 4 is a block diagram that depicts an example computer 400, in an embodiment. Computer 400 uses address translation to associate one monolithic address range of virtual memory addresses with several smaller ranges of physical memory addresses. Computer 400 uses command queues to buffer commands to fill those several physical ranges.

Computer 400 may be an implementation of computer 100. Computer 400 includes coprocessors 441-442, physical memory 450, and virtual memory 410.

Virtual memory 410 comprises a virtual memory address space that is logically divided into virtual pages. Each virtual page may be allocated a respective physical page within physical memory 450.

In operation, an application may acquire a set of virtual pages, such as allocation 415, including virtual pages 431-436. The application may identify allocation 415 as a memory range within a fill request.

5.1 Calloc

For example, the application may dynamically allocate allocation 415 by invoking a standard memory subroutine such as calloc. Calloc may implement allocation 415 by acquiring contiguous virtual memory pages 431-436, which span a continuous range of virtual memory addresses.

Calloc may implicitly initialize allocation 415 by filling it with zeros. Calloc may accomplish filling by submitting a fill request to computer 400.

5.2 Fragmentation

When processing the fill request, computer 400 may consider the arrangement of physical pages that back allocation 415. For example, virtual memory pages 431-436 of allocation 415 are backed by physical memory pages 451-452, 455-457, and 459.

Virtual pages of allocation 415 are contiguous and form a single address range. However, because of fragmentation, physical memory pages 451-452, 455-457, and 459 that back allocation 415 are not entirely contiguous and do not form a single address range.

Although allocation 415 has a single virtual address range, this range corresponds to three physical address ranges. For example, one physical address range contains only physical pages 455-457.

Computer 400 may divide the identified virtual pages of allocation 415 into three subranges that correspond to the three physical address ranges. For example, computer 400 may split the zero filling of allocation 415 into three subranges that respectively include virtual pages 431-432 as a first subrange, virtual page 433 as a second subrange, and virtual pages 434-436 as a third subrange.

5.3 Large Virtual Pages

FIG. 4 shows allocation 415 comprised of six memory pages, regardless of whether the pages are physical or virtual. This implies that physical pages have the same size as virtual pages. In an embodiment, virtual pages are much larger than physical pages. In such a case, each virtual page corresponds to multiple physical pages. For example, database performance of computer 400 may improve if each virtual page is sized in gigabytes. Each physical page may be sized in kilobytes, in which case a virtual page may correspond to tens or hundreds of physical pages. In such a case, one huge virtual page is likely to be associated with many physical pages that are not contiguous.

5.4 Bin Packing

Computer 400 uses a bin packing algorithm to more evenly distribute the workload between coprocessors 441-442. For example, computer 400 may select the subrange of virtual pages 434-436 for assignment to coprocessor 442. According to bin packing, which seeks to allocate equal amounts of work to each coprocessor, computer 400 may balance the load of coprocessors 441-442 by assigning both of the smaller subranges to coprocessor 441, which in this example includes virtual pages 431-433. In this case, each of coprocessors 441-442 is assigned three memory pages to fill.

5.5 Fill Command

Even though coprocessor 441 is assigned a contiguous range of virtual pages 431-433, these virtual pages are scattered amongst two ranges of physical pages, which are physical pages 451-452 in one physical range and physical page 459 as another physical range. As such, computer 400 actually assigns coprocessor 441 two physical ranges that are not contiguous.

An assignment of a particular range to fill may be transferred by computer 400 to coprocessor 441 as part of a fill command that also specifies what value with which to fill the particular range. In some implementations, each of coprocessors 441-442 can only process a fill command that specifies exactly one contiguous range of physical memory addresses. In such an embodiment, computer 450 must identify virtual pages 431-432 in command 471 to coprocessor 441 and virtual page 433 in separate command 472 to the same coprocessor.

5.6 Command Queue

Computer 400 may dispatch fill commands 471-472 to coprocessor 441 faster than the coprocessor can execute those fill commands. As such, coprocessors 441-442 respectively have command queues 461-462 that internally buffer a backlog of commands for later execution. For example, command queue 461 holds fill commands 471-472.

Command queues 461-462 may hold fill commands for many memory ranges, perhaps from multiple fill requests. An embodiment of a command queue may hold tens of fill commands or more. Each coprocessor sequentially removes and executes fill commands from its command queue one at a time, until the queue becomes empty. While a coprocessor is processing its command queue, computer 400 may simultaneously append additional fill commands onto the queue.

In some embodiments, each of coprocessors 441-442 may be capable of translating a virtual address of a virtual page to a physical address of a physical page. In such a case, commands 471-473 specify virtual memory addresses, and coprocessors 441-442 may perform address translation to determine which physical addresses correspond to those virtual addresses.

In other embodiments, coprocessors 441-442 do not perform address translation, and computer 400 must translate a virtual address into a physical address before specifying the address within a fill command.

6.0 Heterogeneous Horizontal Scaling

Figure 5:
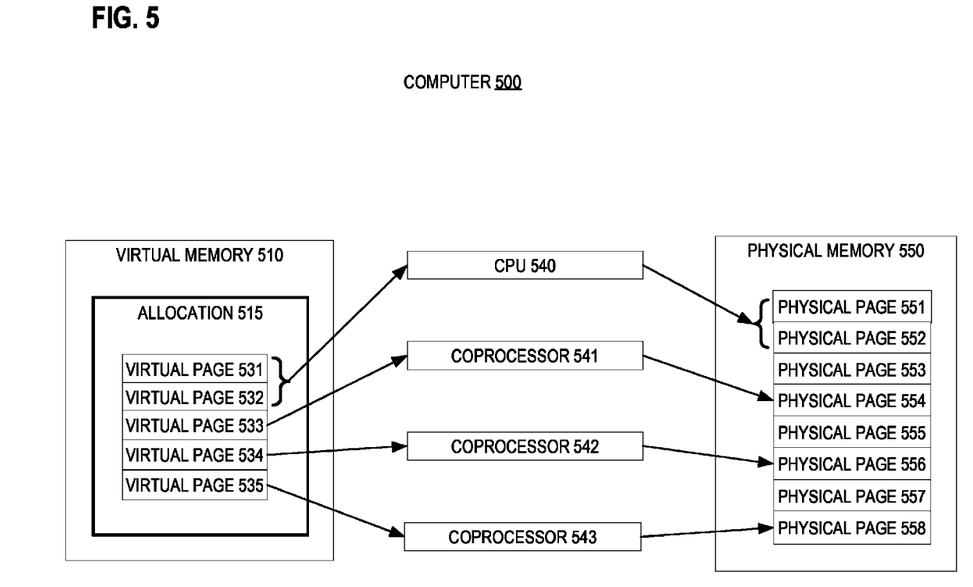
FIG. 5 is a block diagram that depicts an example computer that fills memory, in an embodiment.

FIG. 5 is a block diagram that depicts an example computer 500, in an embodiment. Computer 500 operates its CPU as if the CPU were another coprocessor to achieve heterogeneous horizontal scaling.

Computer 500 may be an implementation of computer 100. Computer 500 includes coprocessors 541-543, physical memory 550, virtual memory 510, and CPU 540. CPU 540 may be a general purpose instruction processor, perhaps with a memory cache, multiple execution cores, and superscalar multithreading.

If CPU 540 is hardware multithreaded, then CPU 540 may be implemented with as much as the entire physical CPU, one core of the physical CPU, or as a little as a single hardware context for one thread. CPU 540 may be one virtual CPU of a virtual machine that is managed by a hypervisor. If computer 500 is a multiprocessor, perhaps with symmetric multiprocessing (SMP) or hardware threading, then computer 500 may have multiple CPUs 540, even though only one is shown.

6.1 Heterogeneous Load Balancing

All of coprocessors 541-543 may have the same throughput and perform memory filling at the same speed. However, CPU 540 may have a different throughput and fill memory at a different speed. To achieve load balancing, computer 500 may assign one amount of memory addresses to CPU 540 for filling and a different amount of memory addresses to each of coprocessors 541-543.

In this example CPU 540 may fill memory twice as fast as a coprocessor can. As such, computer 500 assigns CPU 540 twice as much memory to fill as is assigned to each of coprocessors 541-543. For example, computer 500 assigns two virtual memory pages to CPU 540 and only one virtual page to each of the coprocessors. In another embodiment, coprocessors 541-543 may have a throughput that exceeds that of CPU 540, in which case CPU 540 would be assigned fewer virtual pages to fill than are assigned to each coprocessor.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
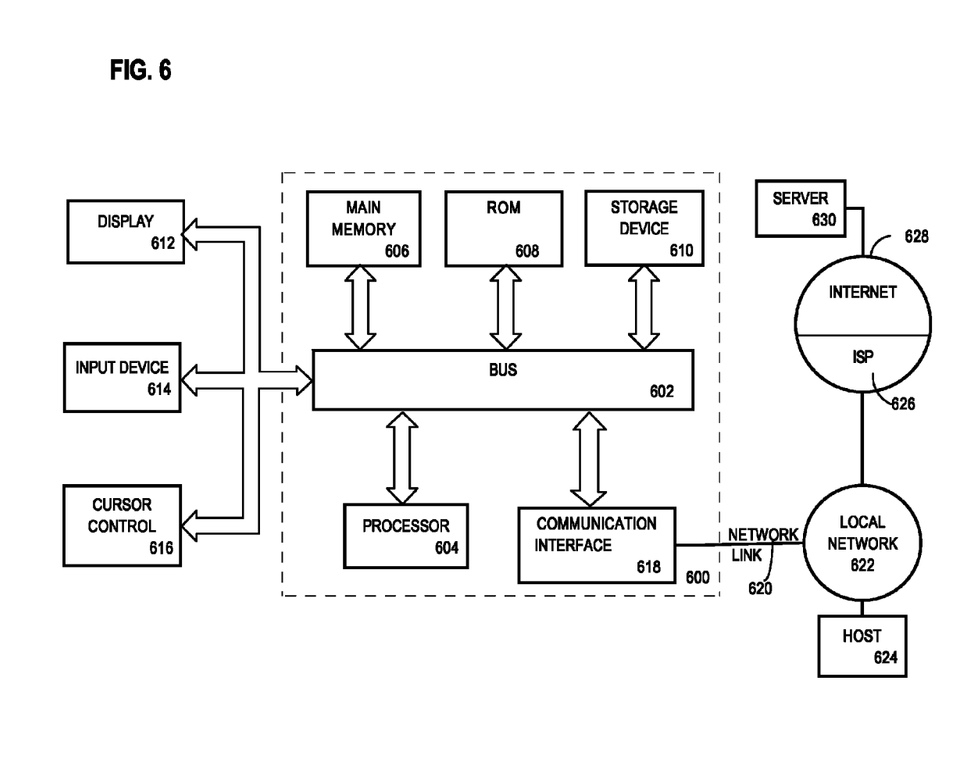
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a request to fill a plurality of ranges of memory addresses with a particular value;
selecting a first subset of said plurality of ranges;
distributing said first subset of said plurality of ranges to a plurality of coprocessors;
after said distributing said first subset, simultaneously:
said plurality of coprocessors storing said particular value into memory at each memory address of said first subset of said plurality of ranges of memory addresses; and
selecting a second subset of said plurality of ranges, wherein said second subset and said first subset are disjoint;
distributing said second subset of said plurality of ranges to said plurality of coprocessors.

2. The method of claim 1 wherein distributing said first subset of said plurality of ranges comprises distributing multiple ranges of said first subset of said plurality of ranges to one of said plurality of coprocessors.

3. The method of claim 1 wherein:
said plurality of ranges of memory addresses comprises a plurality of ranges of physical memory addresses;
said plurality of ranges of physical memory addresses are associated with one range of virtual memory addresses;
said particular value is zero.

4. The method of claim 1 wherein:
said distributing said first subset of said plurality of ranges to a plurality of coprocessors comprises for each range of said first subset of said plurality of ranges, adding a command to a command queue of a respective coprocessor of said plurality of coprocessors;
said command identifies said each range and contains said particular value.

5. The method of claim 1 wherein distributing said first subset of said plurality of ranges to a plurality of coprocessors comprises distributing at least one of said first subset of said plurality of ranges to a central processing unit (CPU).

6. The method of claim 5 wherein distributing at least one of said first subset of said plurality of ranges to a CPU comprises distributing more memory addresses to said CPU than are distributed to at least one of said plurality of coprocessors.

7. The method of claim 1 wherein said selecting a first subset of said plurality of ranges comprises splitting at least one of said plurality of ranges into a plurality of subranges.

8. One or more non-transitory computer readable media storing instructions that include:
   first instructions which, when executed by one or more processors, cause receiving a request to fill a plurality of ranges of memory addresses with a particular value;
   second instructions which, when executed by one or more processors, cause selecting a first subset of said plurality of ranges;
   third instructions which, when executed by one or more processors, cause distributing said first subset of said plurality of ranges to a plurality of coprocessors;
   fourth instructions which, when executed by one or more processors, cause after said distributing said first subset, simultaneously:
      said plurality of coprocessors storing said particular value into memory at each memory address of said first subset of said plurality of ranges of memory addresses; and
      selecting a second subset of said plurality of ranges, wherein said second subset and said first subset are disjoint;
   fifth instructions which, when executed by one or more processors, cause distributing said second subset of said plurality of ranges to said plurality of coprocessors.

9. The one or more non-transitory computer readable media of claim 8 wherein distributing said first subset of said plurality of ranges comprises distributing multiple ranges of said first subset of said plurality of ranges to one of said plurality of coprocessors.

10. The one or more non-transitory computer readable media of claim 8 wherein:
    said plurality of ranges of memory addresses comprises a plurality of ranges of physical memory addresses;
    said plurality of ranges of physical memory addresses are associated with one range of virtual memory addresses;
    said particular value is zero.

11. The one or more non-transitory computer readable media of claim 8 wherein:
    said distributing said first subset of said plurality of ranges to a plurality of coprocessors comprises for each range of said first subset of said plurality of ranges, adding a command to a command queue of a respective coprocessor of said plurality of coprocessors;
    said command identifies said each range and contains said particular value.

12. The one or more non-transitory computer readable media of claim 8 wherein distributing said first subset of said plurality of ranges to a plurality of coprocessors comprises distributing at least one of said first subset of said plurality of ranges to a central processing unit (CPU).

13. The one or more non-transitory computer readable media of claim 12 wherein distributing at least one of said first subset of said plurality of ranges to a CPU comprises distributing more memory addresses to said CPU than are distributed to each of said plurality of coprocessors.

14. The one or more non-transitory computer readable media of claim 8 wherein said selecting a first subset of said plurality of ranges comprises splitting at least one of said plurality of ranges into a plurality of subranges.

15. A device comprising:
    a plurality of coprocessors capable of storing a value at memory addresses of a range of memory addresses; and
    a central processing unit (CPU) connected to said plurality of coprocessors and configured to:
    receive a request to fill a plurality of ranges of memory addresses with a value;
    select a first subset of said plurality of ranges;
    distribute said first subset of said plurality of ranges to a plurality of coprocessors;
    after said distributing said first subset, simultaneously:
       said plurality of coprocessors storing said particular value into memory at each memory address of said first subset of said plurality of ranges of memory addresses; and
       select a second subset of said plurality of ranges, wherein said second subset and said first subset are disjoint;
    distribute said second subset of said plurality of ranges to said plurality of coprocessors.

16. The device of claim 15 wherein distributing said first subset of said plurality of ranges comprises distributing multiple ranges of said first subset of said plurality of ranges to one of said plurality of coprocessors.

17. The device of claim 15 wherein:
    said plurality of ranges of memory addresses comprises a plurality of ranges of physical memory addresses;
    said plurality of ranges of physical memory addresses are associated with one range of virtual memory addresses;
    said particular value is zero.

18. The device of claim 15 wherein:
    said distributing said first subset of said plurality of ranges to a plurality of coprocessors comprises for each range of said first subset of said plurality of ranges, adding a command to a command queue of a respective coprocessor of said plurality of coprocessors;
    said command identifies said each range and contains said particular value.

19. The device of claim 15 wherein distributing said first subset of said plurality of ranges to a plurality of coprocessors comprises distributing at least one of said first subset of said plurality of ranges to a central processing unit (CPU).

20. The device of claim 19 wherein distributing at least one of said first subset of said plurality of ranges to a CPU comprises distributing more memory addresses to said CPU than are distributed to each of said plurality of coprocessors.

21. The device of claim 15 wherein said selecting a first subset of said plurality of ranges comprises splitting at least one of said plurality of ranges into a plurality of subranges.

* * * * *

UNITED STATES PATENT AND TRADEMARK OFFICE
CERTIFICATE OF CORRECTION

PATENT NO. : 9,823,871 B2  
APPLICATION NO. : 14/879970  
DATED : November 21, 2017  
INVENTOR(S) : Pusukuri et al.

Page 1 of 1

It is certified that error appears in the above-identified patent and that said Letters Patent is hereby corrected as shown below:

On the Title Page

Column 2, Item (57), under Abstract, Line 12, delete "coprocessors" and insert -- coprocessors. --, therefor.

In the Specification

In Column 2, Line 41, delete "coprocessors" and insert -- coprocessors. --, therefor.

Signed and Sealed this  
Thirty-first Day of July, 2018

Andrei Iancu  
*Director of the United States Patent and Trademark Office*